United States Patent [19]
Schmitz et al.

[11] Patent Number: 4,952,429
[45] Date of Patent: Aug. 28, 1990

[54] SEPARATING POT FOR GLANDLESS ELECTRICAL OR MAGNETIC DRIVE ASSEMBLIES

[75] Inventors: Bernd-Horst Schmitz, Stolberg; Josef Humpert, Niederzier; Horst Corr, Ubach-Palenberg, all of Fed. Rep. of Germany

[73] Assignee: Uranit GmbH, Jülich, Fed. Rep. of Germany

[21] Appl. No.: 354,037

[22] Filed: May 19, 1989

[30] Foreign Application Priority Data

Jun. 3, 1988 [DE] Fed. Rep. of Germany ....... 3818832

[51] Int. Cl.[5] .................................................. E06B 3/24

[52] U.S. Cl. ...................................... 428/34.1; 138/89; 138/109; 138/129; 138/141; 138/145; 417/423.7; 417/425; 428/34.1; 428/35.7; 428/36.3

[58] Field of Search .................... 428/34.1, 35.7, 36.3; 138/129, 144, 145, 141, 89, 109; 417/425, 423.7, 423; 92/169

[56] References Cited

U.S. PATENT DOCUMENTS 4,408,966 10/1983 Maruyama .......................... 417/420
4,613,289 9/1986 Katera ................................ 417/420
4,645,433 2/1987 Hauenstein .......................... 417/420
4,752,194 6/1988 Wienen ............................... 417/420

*Primary Examiner*—Jose Dees
*Assistant Examiner*—S. Weddington
*Attorney, Agent, or Firm*—Spencer & Frank

[57] ABSTRACT

A separating pot for glandless electrical or magnetic drive assemblies includes a pot jacket having a generally tubular body with two ends and a flange portion at one of the two ends, the pot jacket being composed of fiber reinforced plastic with the fiber being wound in alternating layers of circumferential windings and helical windings, and with the flange portion being composed of additional circumferential windings; a bottom member disposed within and closing off the other of the two ends of the pot jacket, the end of the pot jacket being an open end, the bottom member having a generally cup-shaped portion which includes a rim portion surrounding an interior bottom face, the rim portion facing the open end of the pot jacket and extending in an axial direction away from the interior bottom face, the bottom member being in a press fit with the pot jacket and being glued to the pot jacket, the rim portion having a generally conically-shaped interior surface which is enlarged in a direction away from the interior bottom face.

8 Claims, 2 Drawing Sheets

10 1a 1 2a 2f 1b 2c 2 11 2e 2d 2b

FIG. 2
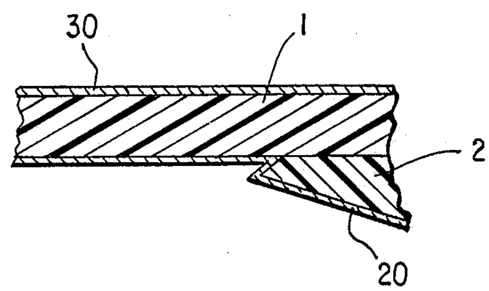
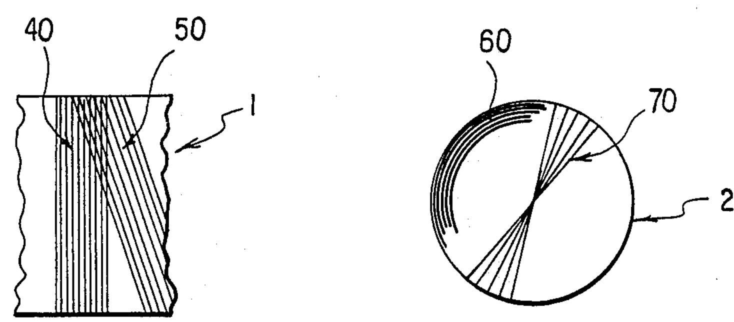
FIG. 3
FIG. 4a
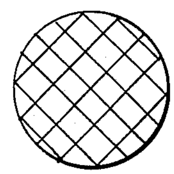
FIG. 4b

SEPARATING POT FOR GLANDLESS ELECTRICAL OR MAGNETIC DRIVE ASSEMBLIES

CROSS-REFERENCE TO RELATED APPLICATION

The present disclosure relates to the subject matter disclosed in German Application No. P 38 18 832.5 of June 3rd, 1988, the entire specification of which is incorporated herein by reference.

BACKGROUND OF THE INVENTION

The present invention relates to a separating pot for glandless electrical or magnetic drive assemblies whose jacket is composed of layers of fiber reinforced plastic, with layers of circumferential windings alternating with helical windings and wherein the open frontal end of the jacket is reinforced by additional circumferential windings.

In DE-OS No. 3,636,404, corresponding to U.S. Pat. No. 4,752,194, a magnetic circulating pump is shown having a separating pot which provides a seal against the pumped medium and is composed of two nested, electrically nonconductive pots. The inner pot is composed of a chemically resistant material, and the outer pot is composed of a compound fiber material, e.g. carbon fiber reinforced plastic (CFRP) or carbon fiber reinforced carbon (CFC). Use of these types of materials, as compared to metal separating pots, avoids losses associated with such metal separating pots during the transmission of power due to eddy currents induced in the separating pot. However, this reference does not describe in detail the structural configuration of either of the separating pots.

In DE-GM No. 87,09,209, and electric motor is shown which includes a separating tube and an end shield, and whose structural configuration corresponds generally to that of a separating pot. In this device, it is necessary that the pressure forces of the pumped medium be absorbed by the motor housing. However, in many cases, particularly in pump assemblies, it is necessary to have a freely suspended separating pot which has an integral bottom member and a connecting flange corresponding to the separating pot structure first discussed hereinabove.

SUMMARY OF THE INVENTION

It is an object of the present invention to provide a separating pot which employs fiber reinforced plastic, is configured in such a manner that it is suitable for mass production, permits long-term and reliable operation of a drive assembly employing it even under relatively high pressure of a medium contacting the separating pot, and does not require that its jacket portion or bottom portion be supported by a housing of the drive assembly.

This is accomplished by a separating pot for glandless electrical or magnetic drive assemblies which includes:

a pot jacket having a generally tubular body with two ends and a flange portion at one of the two ends, the pot jacket being composed of fiber reinforced plastic with the fiber being wound with the fibers being in alternating layers of circumferential windings and helical windings, and with the flange portion being composed of additional circumferential fiber windings; and a bottom member disposed within and closing off the other of the two ends of the pot jacket, said one end of the pot jacket being an open end, the bottom member having a generally cup-shaped portion which includes a rim portion surrounding an interior bottom face, the rim portion facing the open end of the pot jacket and extending in an axial direction away from the interior bottom face, the bottom member being in a press fit with the pot jacket and being glued to the pot jacket, and the rim portion having a generally conically-shaped interior surface which is enlarged in a direction away from the interior bottom face.

Such a pot can be used even for a pumped medium which is at an elevated operating temperature, as well as for corrosive or abrasive media.

The separating pot structure according to the present invention facilitates mass production since individual pot jackets can be formed from a long tube which can be wound in one process phase and subsequently subdivided into plurality of pot jackets. The configuration of the bottom member of the pot, as well as the manner in which the bottom member is joined to the pot jacket, ensures a durable connection therebetween which is able to withstand forces produced by a medium under high pressure, even where the pot jacket has relatively very thin jacket walls.

The invention will be described in greater detail below with reference to an embodiment that is illustrated in the drawing.

BRIEF DESCRIPTION OF THE DRAWINGS

FIG. 2 is an enlarged, schematic view of the separating pot of FIG. 1 having protective layers.

FIG. 3 is a schematic side elevational view of construction of a pot jacket of the separating pot according to the invention FIGS. 4*a* and 4*b* is a schematic end elevational views of two embodiments respectively, at bottom member of the separating pot according to the invention.

DETAILED DESCRIPTION OF THE PREFERRED EMBODIMENT

Figure 1:
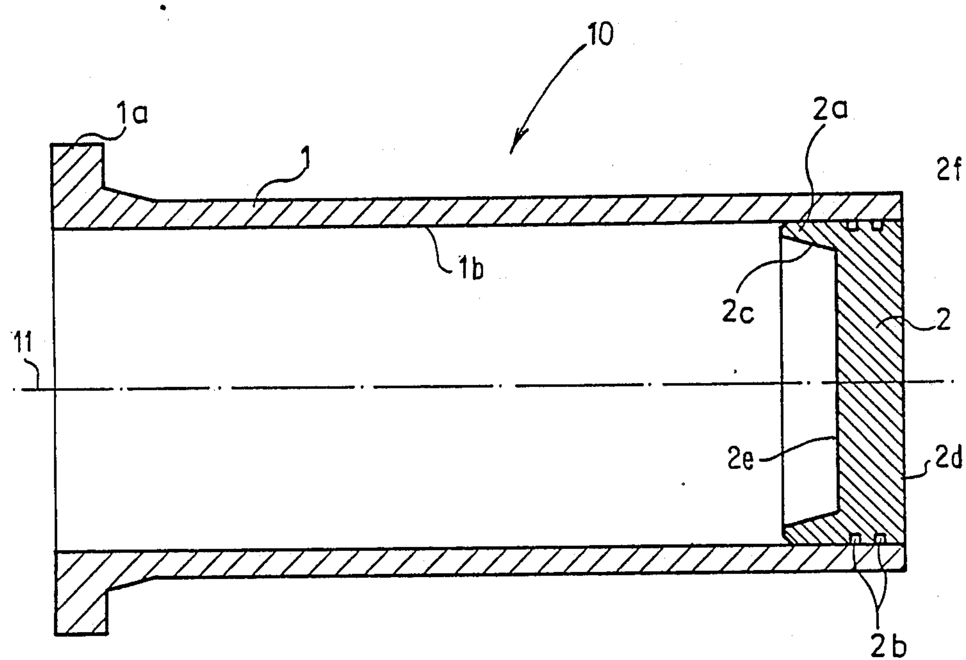
FIG. 1 is a longitudinal sectional view of a separating pot according to the invention.

A separating pot 10 is shown in FIG. 1 which is composed of a carbon fiber reinforced plastic and includes a pot jacket 1 and a bottom member 2. The pot jacket 1 has a longitudinal axis 11, and is a tubular body having an interior wall surface 1*b* and two open ends, wherein one of the two ends has an outwardly extending flange portion 1*a*.

As shown in FIG. 3, the jacket 1 is produced as follows. Carbon fibers which have been saturated with synthetic resin are wound onto a mandrel (not shown) which is removed after the synthetic resin has hardened. The carbon fibers are applied in layers which alternate between layers of circumferential windings 40 and layers of helical windings 50. The helical windings 50 are wound at an angle which is in a range between 10° and 40° as measured with respect to the longitudinal axis 11 of the separating pot 10. A layer thickness ratio of the helical windings 50 to the circumferential windings 40 is in a range of about 2:1. An internal pressure of 100 bar in the separating pot 10 requires a total thickness of the pot jacket 1 of only 1 mm; for a pressure of 25 bar, the wall thickness of the pot jacket 1 need only be about 0.5 mm. The flange portion la of the pot jacket 1 has a greatly thickened wall portion produced by provision of additional circumferential windings 40. When assembled in a pump or motor housing (not shown), the connecting flange 1*a* is tightly fastened to the pump or motor housing and can be centered therein by a coupling ring or the like.

The bottom member 2 has a wall thickness which is greater than the wall thickness of the pot jacket 1. The bottom member 2 may also be composed of CFRP, wherein, e.g. as shown schematically in FIG. 4*a*, the carbon fibers extend both radially (schematically shown as fibers 70) and peripherally (schematically shown as fibers 70, which are disposed annularly about the axis of the bottom member 2. Another possible method of manufacturing for the bottom member 2 is shown in FIG. 4*b;* herein the bottom member is built out of woven cloth wherein the fibers are disposed under air angle e.g. of 90° to each other. As shown in FIG. 1, the bottom member 2 has a generally disk-shaped main body portion which has a generally flat end surface 2*d* on one end and a cup-shaped portion on the other end which includes a beveled rim portion 2*a*, an interior bottom face 2*e*, and an interior rim face 2*c*. The beveled rim portion 2*a* has a generally conically-shaped surface which extends axially from the bottom face 2*a* and which enlarges in direction away from the bottom face 2*e*. Additionally, the bottom member 2 has a peripheral wall portion 2*f* having at least one, and preferably a plurality of, circumferential grooves 2*b* for receiving a settable adhesive material.

The bottom member 2 is inserted into the pot jacket 1 and is initially retained in the pot jacket 1 by a press fit between the interior wall surface lb of the pot jacket 1 and the peripheral wall portion 2*f* of the bottom member 2. The bottom member 2 is glued in place in the pot jacket 1 by the settable adhesive material. The beveled rim portion 2*a* has sufficient radial elasticity that the pressure of the pumped medium in the separating pot 10 causes the beveled rim portion 2*a* to be urged against the inner wall 1*b* of the pot jacket 1, thereby creating an additional radial force between the pot jacket 1 and the bottom member 2 which improves the press fit therebetween. This ensures a tight and durable connection between bottom member 2 and the pot jacket 1 even if the pot jacket 1 is expanded by the pressure of the pumped medium. If the separating pot 10 is to be used for a pumped medium which is at a relatively high operating temperature, an adhesive should be employed which hardens either at this operating temperature or slightly above it. In this way, stresses are reduced in the adhesive layer between the pot jacket 1 and the bottom member 2 during operation of the pump.

As shown in FIG. 2, protective layers 20 and 30 can be provided on the separating pot 10 for use with corrosive or abrasive media. In this case, the interior and exterior surfaces of the separating pot 10 which would come into contact with the pumped medium, normally the interior faces, can have one or both of the protective layers 20 and 30 added after the pot jacket 1 and the bottom member 2 have been assembled. These protective layers 20 and 30 can, for example, be formed of partially stabilized zirconium oxide which can be applied, for example, by plasma spraying the surfaces to be protected to a layer thickness of about 0.2 mm or thicker. Thicknesses in this range have been found to be satisfactory. Depending on the requirements to be met, a plurality of protective layers composed of different materials may also be applied on top of one another using in different processes if necessary. For example, ductile layers can be applied first which are then covered by ceramic layers. These protective layers can, for example, include a wear resistance layer. Combinations of processes can be used for applying the protective layers, for example, plasma spraying can be used in conjunction with galvanic processes.

It will be understood that the above description of the present invention is susceptible to various modifications, changes and adaptations, and the same are intended to be comprehended within the meaning and range of equivalents of the appended claims.

We claim:

1. A separating pot for glandless electrical or magnetic drive assemblies, comprising:
   a pot jacket having a generally tubular body with two ends and a flange portion at one of said two ends, said pot jacket being composed of fiber reinforced plastic with the fiber being wound in alternating layers of circumferential windings and helical windings, and with said flange portion being composed of additional circumferential windings; and
   a bottom member disposed within and closing off the other of said two ends of said pot jacket, said one end of said pot jacket being an open end, said bottom member having a generally cup-shaped portion which includes a rim portion surrounding an interior bottom face, said rim portion facing said open end of said pot jacket and extending in an axial direction away from said interior bottom face, said bottom member being in a press fit with said pot jacket and being glued to said pot jacket, and said rim portion having a generally conically-shaped interior surface which is enlarged in a direction away from said interior bottom face.

2. A separating pot as defined in claim 1, wherein said bottom member is composed of fiber reinforced plastic.

3. A separating pot as defined in claim 1, wherein: an adhesive glues said pot jacket and said bottom member together, with said adhesive being hardenable at or above a temperature which corresponds to a temperature of an operating environment in which the separating pot is to be used; and said bottom member including at least one or more circumferential grooves for receiving said adhesive.

4. A separating pot as defined in claim 2, wherein an adhesive connects said pot jacket and said bottom member together, with said adhesive being hardenable at or above a temperature which corresponds to a temperature of an operating environment in which the separating pot is to be used; said bottom member including at least one or more circumferential grooves for receiving said adhesive.

5. A separating pot as defined in claim 1, further comprising at least one layer applied to at least one of the exterior and the interior surfaces of said bottom member and said pot jacket, said at least one layer being corrosion resistant.

6. A separating pot as defined in claim 1, further comprising at least one layer applied to at least one of the exterior and interior surfaces of said bottom member and said pot jacket, said at least one layer being wear resistant.

7. A separating pot as defined in claim 2, further comprising at least one layer applied to at least one of the exterior and interior surfaces of said bottom member and said pot jacket, said at least one layer being corrosion resistant.

8. A separating pot as defined in claim 2, further comprising at least one layer applied to at least one of the exterior and interior surfaces of said bottom member and said pot jacket, said at least one layer being wear resistant.

* * * * *